United States Patent [19]

Praamsma

[11] 4,274,131

[45] Jun. 16, 1981

[54] LIGHT DIFFUSING MEANS FOR A PHOTOGRAPHIC ENLARGER

[75] Inventor: Michael F. Praamsma, Santa Monica, Calif.

[73] Assignee: Vivitar Corporation, Santa Monica, Calif.

[21] Appl. No.: 48,622

[22] Filed: Jun. 14, 1979

[51] Int. Cl.³ .................... G03B 27/54; F21V 11/00
[52] U.S. Cl. .................... 362/355; 362/356; 355/67
[58] Field of Search .................. 355/1, 32, 35–38, 355/77, 67–71; 362/355, 356

[56] References Cited

U.S. PATENT DOCUMENTS

| | | | |
|---|---|---|---|
| 606,593 | 6/1898 | Stender | 355/67 |
| 2,327,818 | 8/1943 | Peterson | 355/67 |
| 3,184,753 | 5/1965 | Koster | 355/1 X |
| 3,273,451 | 9/1966 | Wilson | 355/35 X |
| 3,279,311 | 10/1966 | Lichtner | 355/71 |
| 3,492,070 | 1/1970 | Zahn | 355/37 |
| 3,561,867 | 2/1971 | Simmon | 355/67 |
| 3,756,712 | 9/1973 | Weisglass et al. | 355/32 X |
| 3,756,719 | 9/1973 | Harter | 355/67 |
| 3,880,520 | 4/1975 | Weisglass | 355/37 |
| 3,927,941 | 12/1975 | Yamaguchi | 355/71 |
| 4,131,362 | 12/1978 | Gandini | 355/71 |

FOREIGN PATENT DOCUMENTS 1522019  6/1969  Fed. Rep. of Germany ............ 355/71

Primary Examiner—Donald A. Griffin
Attorney, Agent, or Firm—Poms, Smith, Lande & Rose

[57] ABSTRACT

A light diffusing means for a photographic enlarger adapted to be positioned between a light mixing module and a film negative carrying module, the diffusing means including a diffuser body member having a light inlet opening, an internal light reflecting and diffusing chamber of frustoconical form, and an enlarged light outlet opening. Light transmitting and diffusing disks are provided at the inlet and outlet light openings. A conical member with a conical light reflecting surface is positioned coaxially in said chamber and in spaced relation to said openings for regulating the amount of light intensity distributed in a radial direction towards the periphery of the enlarged light outlet opening, particularly to enhance the intensity of light at the peripheral margins of the outlet opening.

9 Claims, 4 Drawing Figures

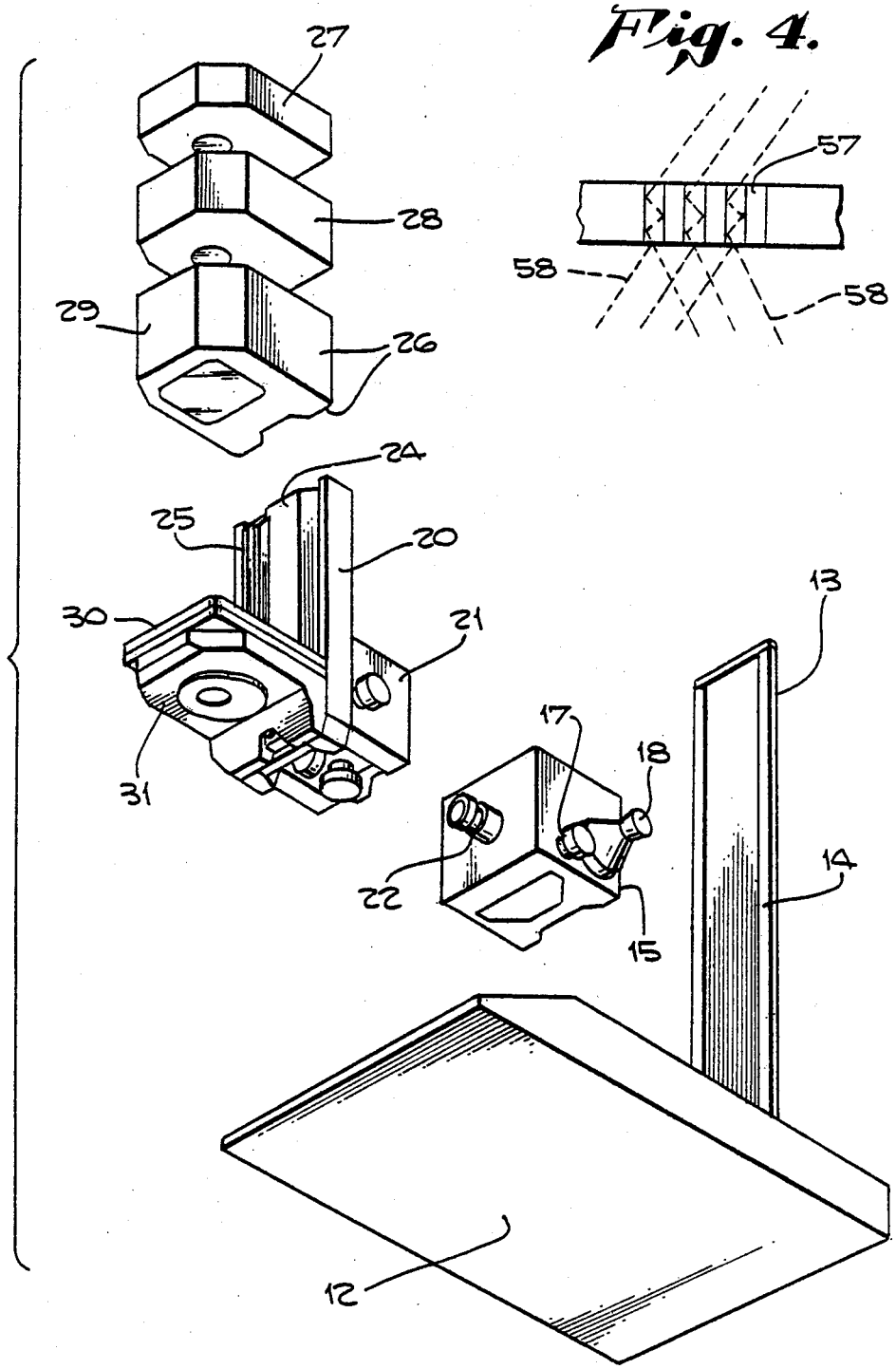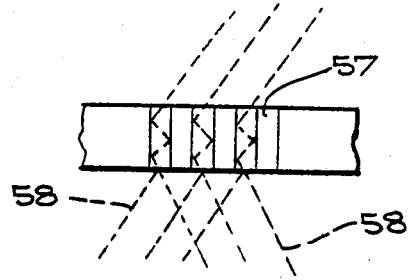

LIGHT DIFFUSING MEANS FOR A PHOTOGRAPHIC ENLARGER

BACKGROUND OF INVENTION

Photographic enlargers include a light source which emits light beams for illuminating a film negative for an enlarger lens which will reproduce the image on the film negative on selected printing paper. Light beams from the light source may not be uniformly distributed. In the case of photographic enlargement with color, color compensating filters such as plastic, geltin, or dichroic filters, are employed to color correct the light to provide a desired color photograph. Light mixing means and/or light diffusing means are employed to provide more uniform illumination of a film negative. After mixing, light beams traveling along the axis of the light path generally provided greater light intensity at the central portion of the film negative than at peripheral margins thereof.

Prior proposed light mixing and diffusing means have included the use of a flat disk in the central portion of the light path to prevent direct light from the light source from impinging upon the film negative plane. Intensity of light at the peripheral margins was not changed and was of insufficient intensity to compensate for the cosine 4 fall off of the enlarger lens. The image on the film negative transmitted by the enlarger lens under such circumstances was not seen by the enlarger lens under conditions of uniform light intensity over the film negative plane. As a result, a photographic print made under such conditions was nonuniformly exposed.

Another proposed construction of a light diffusing means included use of a rectangular cylinder light diffusing chamber having parallel walls with a conical or semi-spherical outwardly directed reflecting surface provided on an element within the chamber to redistribute light admitted into the chamber to improve the intensity of light in the peripheral areas of the film negative. Different light reflecting surfaces were provided on the chamber walls to cooperate with the conical light reflecting surface to provide such improved light intensity distribution. See U.S. Pat. No. 3,927,941.

SUMMARY OF INVENTION

The present invention contemplates a light diffusing module arranged to receive mixed light in partially diffused condition and to regulate the distribution of the received light leaving the diffusing means so that the light intensity is distributed in a radial direction toward the periphery of the outlet opening in accordance with a selected pattern.

The primary object of the present invention therefore is to provide a light diffusing means in module form of novel construction and to provide light energy distribution over a film negative plane in a desired pattern.

Another object of the present invention is to provide a light diffusing means having a light reflecting and diffusing chamber of frustoconical shape.

Another object of the present invention is to provide a light diffusing means having a conical reflecting surface positioned within the chamber and spaced from inlet and outlet light openings for cooperation with the light reflecting said diffusing surfaces of the chamber to provide the selected light energy distribution pattern on the negative film plane.

A further object of the present invention is to provide a light diffusing means having a conical member located within a frustoconical light reflecting and diffusing chamber in which the conical reflecting surface is determined by the conical form generated by diagonal lines extending diametrically across the chamber from corresponding peripheral points on the inlet and outlet light openings of the chamber.

A still further object of the present invention is to disclose a light diffusing means in which the conical member located in the frustoconical chamber is provided with a base which eclipses the area of the inlet opening when viewed from a point on the axis of the chamber at the light outlet opening.

A still further object of the present invention is to provide a light diffusing means having a conical chamber within which is positioned a conical light reflecting surface so related to the conical chamber that the intensity of light is enhanced at the peripheral marginal areas of the light outlet opening of the chamber.

The invention contemplates a light diffusing module having the features described above which is readily adapted to be associated with a light mixing module and other selected modules for a photographic enlarger which may be utilized for black and white and color photographic enlargements.

Various other objects and advantages of the present invention will be readily apparent from the following description of the drawings in which an exemplary embodiment of the present invention is shown.

IN THE DRAWINGS:

FIG. 2 is an exploded perspective view of the photographic enlarger shown in FIG. 1.

FIG. 4 is a fragmentary schematic view of a fiber optic diffuser means utilized in the diffusing system of this invention.

Figure 1:
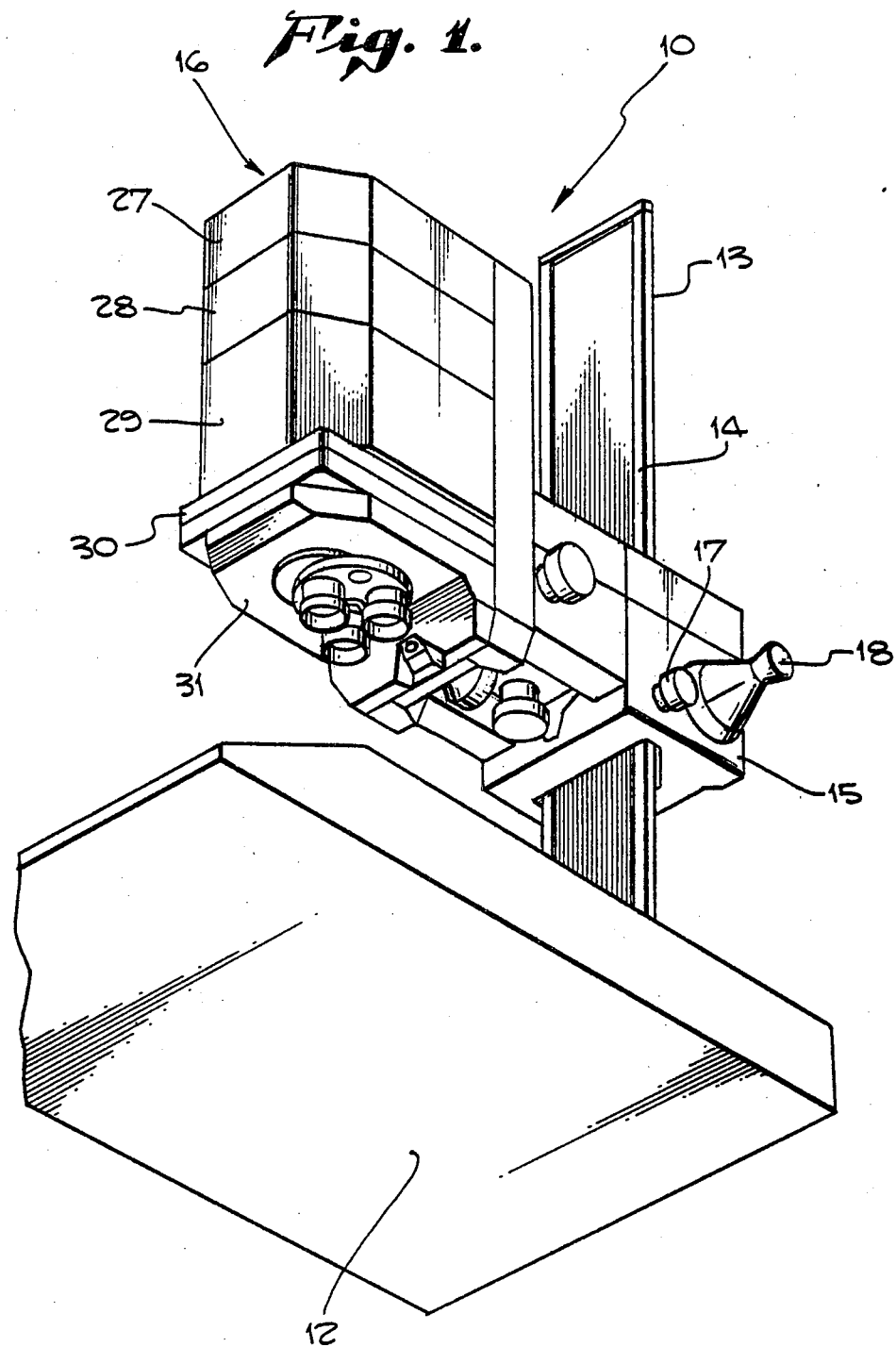
FIG. 1 is a perspective view of a photographic enlarger having a construction adapted to utilize the light diffusing means of this invention.

In FIG. 1 there is generally shown an exemplary photographic enlarger generally indicated at 10 which may incorporate light diffusing means of this invention. Photographic enlarger 10 generally comprises a base 12 provided with an upstanding rigid support column 13 provided with suitable track means 14 for cooperation with a carriage 15 adapted to travel along track means 14 for adjusting the vertical height of an enlarger assembly generally indicated at 16. Carriage 15 is provided with a suitable crank means 18 for moving carriage means 15 along the support column and with lock means 17 for locking the carriage means 15 in a selected position. It will be understood that the carriage means may be adjustably moved along column 13 by manual actuation, electrically driven actuation, or by suitable computer controlled means.

Enlarger assembly 16 may comprise a chassis means 20 cooperably connected to carriage 15 by connecting means 21 which may be provided suitable pivotal movement about a horizontal axis by a pivot member 22 extending from carriage 15. Chassis means 20 may be disposed generally parallel to support column 13 and provides on its outwardly directed face 24 suitable groove means 25 for cooperation with complementary engagement means provided on each of several modules 27, 28 and 29, for example, selected for use in a photographic enlarging process. Chassis 20 also may support a carrier means 30 for holding a film negative from which an enlargement is to be made. Chassis 20 also supports a suitable lens carrier 31 to which may be attached selected enlarger lens means. If desired, but not shown, a bellows system may be supported by the chassis between the lens carrier means and the film negative carrier. Suitable means are provided for adjustment and securement of the several modules on the chassis, such means not being shown because they do not form part of this invention.

Modules 27, 28 and 29 are exemplary; module 27 may comprise a suitable light source; module 28 a suitable filter assembly including a light mixing system; and module 29 a light diffusing means embodying this invention.

Figure 3:
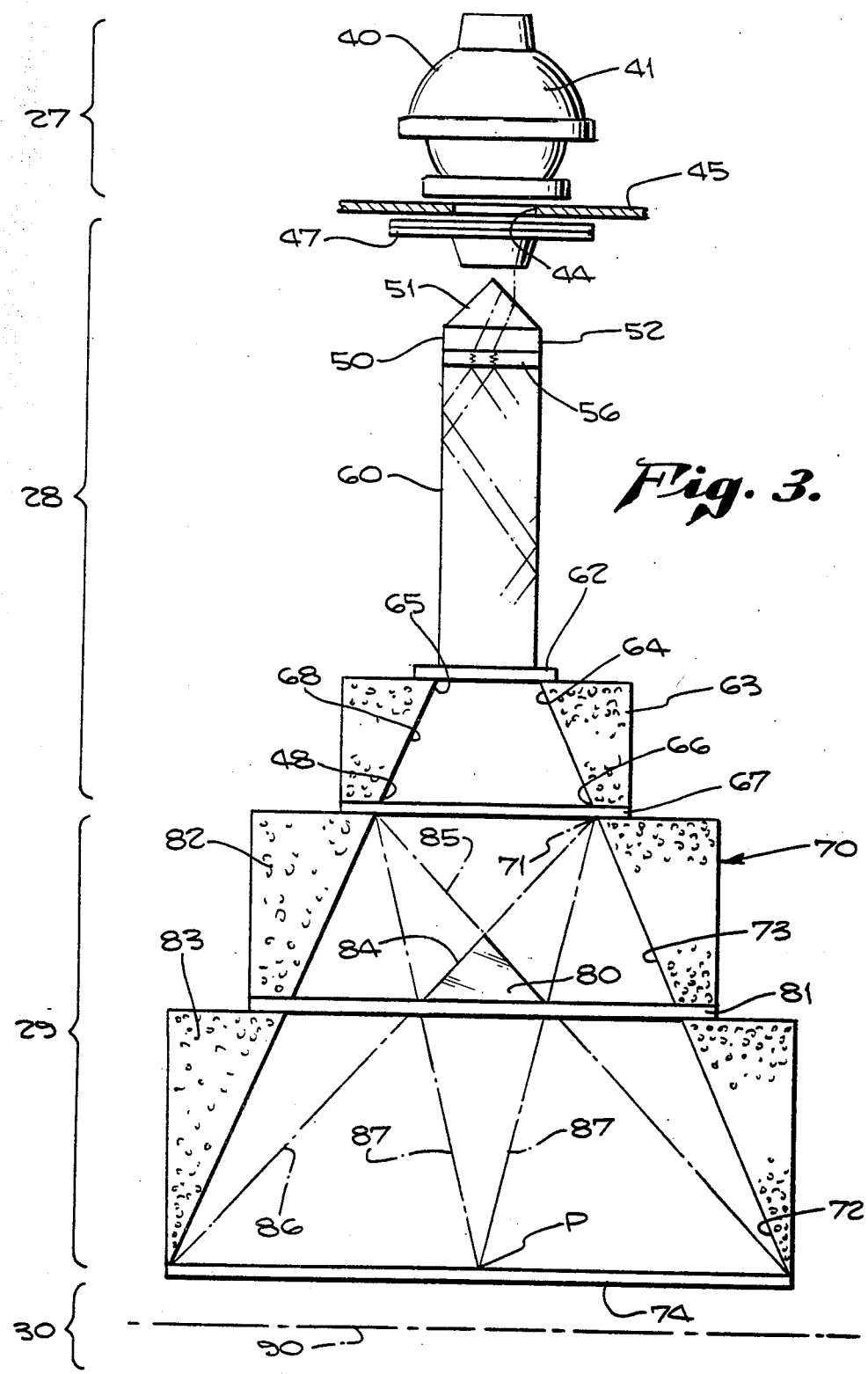
FIG. 3 is a schematic view of the enlarger modules shown in FIG. 1 and illustrating the light diffusing means of this invention.

In FIG. 3 modules 27, 28 and 29 are schematically illustrated in order to better show and explain the mixing and diffusing of light from the light source in order to provide a desired light energy distribution at the plane of the film negative held by the negative carrier 30.

Light source 40 may comprise a lamp means of well-known manufacture, as for example a tungsten halogen quartz lamp of 300 watts and suitable voltage. The lamp housing 41 may include an internal reflective surface to direct its light beams through a light transmitting and heat reflecting mirror 43 before being transmitted through an aperture 44 provided in a suitable aperture plate 45 carried by module 27.

Light passing through aperture 44 may be modified by a suitable selected filter means 47 at the entrance to module 28 which serves as a light mixing means. Filter means 47, for the purposes of this description, may be any suitable filter arrangement for modifying or correcting the color components of the light emanating from the light source 40. Filter means 47 may include the construction and operation of a filter means providing additive subtractive color modification.

Light, which leaves the exit side of the filter means 47, is comprised of light beams which have nonuniform random energy distribution over the exit side of the filter means. Module 28 serves to mix such light so that when the light reaches the exit port 48 of the light mixing module 28 the energy distribution inlcuding intensity and color of such light will be substantially uniform across the area of the exit or outlet port of the mixing module 28.

Light mixing module 28 further includes an axicon lens 50 below the filter means 47 and located along the optical light path of light passing through the filter means. Axicon lens 50 comprises a conical lens surface 51, in this example having a conical angle of approximately 45 degrees to the axis of the light path. The conical portion of lens 50 may be integral with a cylindrical portion 52 of lens 50, the cylindrical portion facilitating handling and mounting of the axicon lens. Uncollimated light beams, which exit from filter means 47, are refracted by the conical lens surface 51 so that substantially all of the light beams refracted thereby are directed through the axicon lens 50 at a nonzero angle to the axis of the light path. At the exit face 53 of axicon lens 50 and interfacing therewith is a fiber optic diffuser means 56 to receive such exiting light beams at an angle.

Fiber optic diffuser means 56 comprises a multitude of high density light transmitting optical fibers each cladded with a suitable coating to provide complete and multiple reflection of light beams along the length of the optical fiber. Such fibers, such as fiber 57 in FIG. 4, receive light at a selected range of angles in order to provide complete reflection of the light beam therethrough and to exit such light in a fan shaped or conical fan pattern as schematically indicated at 58. Exemplary optical fibers may be from 5 to 10 microns in diameter, the fibers being very tightly assembled in parallel and fused at their cladding. An exemplary thickness of diffuser means 56 may be 1/16 inches. One of the characteristics of such an optical fiber is that reflection of a light beam entering a fiber 57 at a selected angle of between 30 to 40 degrees will be completely reflected and will emanate and depart from the exit port of the fiber at virtually the same angle at which it entered the fiber.

Thus, the axicon lens which receives light beams on its conical surface will transmit such light beams at an angle for entrance into the optic fiber 57 at a selected angle and will be transmitted therefrom at virtually the same angle and in the form of an outwardly expanding fan shaped cone which provides intimate mixing and dispersion of light departing the exit face of the fiber optic diffuser means 56. It is estimated that approximately 90% of the mixing of light receive from the filter means 47 is accomplished at the axicon lens and fiber optic diffuser means by such overlapping of the outwardly expanding fan shaped or conical shaped pattern of the light beams as they depart the exit face of the diffuser disk 56. Effective major mixing of light received from the filter means 47 thus occurs in a relatively short axial distance.

Light which exits from diffuser means 56 may then be transmitted along a cylindrical light guide 60 which may be made of a suitable transparent acrylic plastic. Light guide 60 may need not be cladded and causes further mixing of the light beams as they are reflected and travel along the length of the light guide. The light guide 60 may be any selected length.

Light transmitted from the exit face of light guide 60 is passed through a diffuser disk 62 which may be of conventional plastic or ground glass and which further scatters the light received.

Light mixing module 28 also comprises a body member 63 provided with a frustoconical chamber 64 having an inlet opening 65 to receive mixed and scattered light from diffuser disk 62. The frustoconical chamber 64 permits expansion of the light beams to an extended area at exit port 66 of chamber 64, the exit port being provided with another diffusion disk 67 of conventional form. In this example, light entering the inlet port 65 is transmitted through a port of approximately 1 inch in diameter and the light is expanded to the exit port 66 of approximately 2-¼ inches in diameter in this example. Expansion of the light beams at the end of light mixing module 28 provides an extended area secondary light source for the enlarger lens (not shown) or for a diffusing means.

Body member 63 may be made of a white Styrofoam of selected cellular size for providing a chamber surface 68 which not only reflects light but also serves to further diffuse the light. It is estimated that light passing through the extended area diffusion disk 67 is about 99% mixed.

The above described light mixing module 28 is the subject of a copending application Ser. No. 48,621 filed June 14, 1979 owned by a common assignee.

Light diffusing module 29, to which the present invention is directed is provided to receive light departing from the light mixing module 28 and to further distribute the light so that the light intensity at the outlet or exit side of the light diffusing module 29 has a selected light energy distribution, particularly at the peripheral margins of its exit port.

Light diffusing module 29 compises a diffuser body member 70 having a light inlet opening 71 and a light outlet opening or port 72 of enlarged area as compared with the inlet opening 71 as for example 2 ¼" compared to 6.4." Body member 70 includes an internal light reflecting chamber 73 of frustoconical form extending between said inlet and outlet light openings 71 and 72. Body member 70 may be made of white cellular Styrofoam the same as body member 63 of the light mixing module 28. The frustoconical chamber 73 is of the same conical angle as frustoconical chamber 64 and is an extension thereof. The interior Styrofoam surfaces of chamber 73 provide light reflecting and diffusing characteristics for further mixing and diffusing of the light.

The diffusing disk 67 is provided at the inlet opening 71 of the chamber 73 and a light diffusing disk 74 is provided at the outlet port 72.

Means for regulating the amount of light intensity distributed from the axis of the light path in a radial direction towards the peripheral margins of the enlarged light outlet opening 72 is provided by a light reflecting conical member 80 positioned in spaced relation to the inlet and outlet openings 71, 72 and coaxial with the axis of the light path of the light beams. Conical member 80 may be suitably supported in chamber 73 upon a transparent thin glass plate 81 suitably mounted between upper and lower body portions 82 and 83 of body member 70.

Conical member 80 is provided with highly reflective silvered conical surfaces 84 to reflect the central portion of light entering chamber 73 to the reflective and diffusing surface 75 and 76 of chamber 73 on body portions 82, 83. The location of conical member 80 and the conical angle of the member are of importance in determining the energy distribution of light at the peripheral margins of the outlet opening 72. The relationship of the frustoconical chamber 73 to the location and shape of the conical member 80 may be determined by generating conical surface 84 by drawing diagonal lines 85 and 86 extending from edges of inlet opening 71 to a diametrically opposite edge point on outlet opening 72. The base of the cone so determined is located by viewing the conical member 80 from a point P on the axis of the system at the outlet opening 72 so that of the conical member 80 may be located where the base of the cone will fully eclipse the inlet opening 71. Such eclipse lines are indicated by lines 87. As a result of determining the shape of conical member 80 as above indicated and locating it along the axis of the light path, it will be apparent that light entering inlet opening 71 will not cross the axial point P at the outlet opening 72 and that the central portion of light entering inlet opening 71 will be reflected radially outwardly by the conical member 80 to the light reflecting and diffusing walls 75 and 76 of the upper and lower body portions 82, 83 and thus be distributed over outlet diffuser plate 74 in a pattern in which the energy of light distributed at the peripheral margins of the outlet opening 72 is enhanced and the energy distribution of light over the major central portion of opening 72 is substantially uniform.

Diffused light exiting from outlet opening 72 of the diffuser module 29 virtually uniformly illuminates the film negative plane 90 on which a film negative may be positioned by the film carrier module 30. In addition, peripheral margins of outlet opening 72 have enhanced light energy distribution in order to compensate for the cosine 4 fall off of the enlarger lens so that light incident upon the plane at which the print paper is located is essentially uniform over the entire area of the print plane (not shown). It will thus be readily apparent that the light diffusing module 29 described above which has received modified or color corrected substantially mixed light from the light mixing module 28 has transmitted such light and expanded the area of such light so that it is virtually uniformly distributed in terms of light energy over the film negative plane and thereby provides a uniform exposure of print paper at the print plane.

It will be understood that the conical angle of cone member 80 may be slightly varied in order to regulate or modify the distribution of light energy at the peripheral margins. Modifying the conical angle of conical member 80 will not effect the eclipse function of the base of the conical member 80. Thus, distribution of light energy at the peripheral margins may be somewhat varied without modifying the uniform distribution of light energy radially inwardly of said margins.

The light diffusing means of this invention thus uses a novel arrangement of a frustoconical light reflecting and diffusing surface for inwardly reflecting light in which some of the light reflected at the upper portion of the surface may be directed against a conical reflecting surface having an angle related to the frustoconical shape of the diffusing surface and light from the central portion of the entering light path is reflected from the conical surface to redistribute light energy across the exit opening of the frustoconical chamber in a desired pattern. Thus, light energy at peripheral margins of the exit opening is enhanced to provide desired illumination of a film negative.

Any changes and modification of the invention described above coming within the scope of the appended claim are embraced thereby.

I claim:

1. A light diffusing means for a photographic enlarger comprising the combination of:
   a diffuser body member having a light inlet opening, an enlarged light outlet opening,
   and an internal light reflecting chamber of frustoconical form extending between said inlet and outlet light openings;
   light transmitting and diffusing discs at the inlet and outlet light openings;
   and means in spaced relation to said light inlet and outlet openings for regulating the amount of light intensity distributed in a radial direction towards the periphery of the enlarged light outlet opening;
   said means having a surface eclipsing the area of the inlet opening as viewed from a point on the optical axis of the body member at the plane of the outlet opening.

2. In a light diffusing means as stated in claim 1 wherein said means for regulating the amount of light intensity in a radial direction includes means for increasing the amount of light intensity towards the periphery of the enlarged light outlet opening.

3. In a light diffusing means as stated in claim 1 wherein said means for regulating the amount of light intensity in a radial direction towards the periphery of the enlarged light outlet opening includes means having a conical reflecting surface coaxially positioned in said chamber, the shape of the conical reflecting surface being related to the shape of the frustoconical chamber such that light entering the inlet opening will not cross the optical axis at the outlet opening, the conical reflecting surface lying generally on the surface of a cone generated by diagonal lines extending from inlet to outlet opening peripheries.

4. A light diffusing means comprising:

a body member having a chamber for passage of light with an entrance opening and an exit opening, the cross sectional area of said chamber expanding from said entrance opening to said exit opening, said chamber having a light reflecting and diffusing surface;

and a light reflecting element between said openings and reflecting the central portion of light passing through said entrance opening outwardly toward said diffusing surface, the base of said element having a cross sectional area sufficient to eclipse said entrance opening when viewed from a point on the optical axis at said exit opening, whereby light energy at the peripheral portion of said exit opening is distributed in accordance with a selected pattern.

5. A light diffusing means as stated in claim 4 wherein said expanding chamber of said body member is frustoconical in shape, and said element is conical in shape.

6. A diffusing means as stated in claim 4 wherein said light diffusing surface of said chamber extends from entrance opening to exit opening.

7. A light diffusing means comprising:

a diffuser body member having a light inlet opening, a light outlet opening, and an internal light reflecting chamber of frustoconical form expanding from said inlet opening to said outlet opening;

light transmitting and diffusing discs at said inlet and outlet light openings;

a transparent support means betweeen said inlet and outlet openings;

and means for increasing the amount of light intensity distributed in a radial direction at peripheral margins of the light outlet opening, said means being supported from said transparent support means and arranged on the optical axis of said body member and spaced generally midway between said light inlet and outlet openings.

8. A light diffusing means as stated in claim 7 wherein said means for regulating the amount of light intensity includes a surface eclipsing the area of the inlet opening as viewed from a point on the optical axis at the plane of the outlet opening.

9. A light diffusing means for a photographic enlarger comprising the combination of:

a diffuser body member having a light inlet opening, an enlarged light outlet opening, and an internal light reflecting chamber of frustoconical form extending between said inlet and outlet light openings;

light transmitting and diffusing discs at the inlet and outlet light openings;

and means in spaced relation to said light inlet and outlet openings for regulating the amount of light intensity distributed in a radial direction towards the periphery of the enlarged light outlet opening;

said means for regulating the amount of light intensity including a conical reflecting surface coaxially positioned in said chamber, said conical reflecting surface lying on the surface of a cone generated by diagonal lines of the conical chamber extending from the periphery of the inlet opening to diametrically opposite peripheral points of the outlet opening;

the diameter of the generated cone being determined by extending lines from the optical center of the enlarged light outlet opening to the periphery of the light inlet opening.

* * * * *